United States Patent
Kosmalski

[11] Patent Number: 5,826,668
[45] Date of Patent: Oct. 27, 1998

[54] SQUARE CUT TURF PLUGGING TOOL WITH ADJUSTABLE CUT DEPTH

[76] Inventor: John Kosmalski, 7836 Bethel Church Rd., Saline, Mich. 48176

[21] Appl. No.: 755,637

[22] Filed: Nov. 24, 1996

[51] Int. Cl.$^6$ .................................................. A01B 45/04
[52] U.S. Cl. .......................... 172/19; 172/371; 294/50.7; 294/60; 30/315
[58] Field of Search .................................. 172/19, 21, 22, 172/371, 378, 380, 385; 294/50.7, 56, 59, 60; 111/106, 92, 98; 30/315, 316, DIG. 7, DIG. 5

[56] References Cited

U.S. PATENT DOCUMENTS

| | | | |
|---|---|---|---|
| D. 306,814 | 3/1990 | Shields | 172/19 X |
| 630,483 | 8/1899 | Brooks | 294/50.7 |
| 634,483 | 10/1899 | Sprague | 111/92 |
| 678,373 | 7/1901 | Blaser | 294/60 X |
| 1,531,751 | 3/1925 | Mena | 294/60 |
| 1,757,925 | 5/1930 | Kirkpatrick | 294/60 X |
| 1,783,026 | 11/1930 | Ober | 294/50.7 |
| 1,952,585 | 3/1934 | Croasdale, Jr. et al. | 294/60 X |
| 2,612,725 | 10/1952 | Casey | 172/22 |
| 2,618,500 | 11/1952 | Peach | 294/50.7 |
| 2,899,231 | 8/1959 | Steiner | 294/50.7 X |
| 3,273,930 | 9/1966 | Gottfried | 294/50.7 |
| 3,506,296 | 4/1970 | Nelson | 294/60 X |
| 4,966,238 | 10/1990 | Shields | 172/19 |
| 5,310,231 | 5/1994 | Burkhart | 294/59 |
| 5,671,533 | 9/1997 | Burkhart | 172/375 X |

OTHER PUBLICATIONS

Wonder Planter Ad, p. 49; The Elks Magazine Mar. 1996.

*Primary Examiner*—Terry Lee Melius
*Assistant Examiner*—Victor Batson
*Attorney, Agent, or Firm*—James M. Deimen

[57] ABSTRACT

A device and method for cutting, removing and inserting adjustable depth plugs of square straight edged turf. Square straight edged turf is readily positionable and makes a clean patch where a straight edge must be maintained. The device has a square frame in plan view with the four sides having openings and an open top and bottom. The square frame allows for the storage and easy transport of the square cut turf plugs to the insertion location, while the openings in the frame allow access to the stacked plugs. A cutting edge is provided on the open bottom with adjustable stops positioned near the open bottom. The adjustment of the stops allows the depth or thickness of the turf plug to be varied as needed. Consequently, the plugs can be varied as to depth to be cut. Angle irons comprise the adjustable stops, and the frame may be of welded steel or aluminum.

11 Claims, 2 Drawing Sheets

SQUARE CUT TURF PLUGGING TOOL WITH ADJUSTABLE CUT DEPTH

BACKGROUND OF THE INVENTION

The field of the invention pertains to turf maintenance. In particular, the invention pertains to a turf plugging device or tool. For golf courses and lawns, it may be aesthetically important to maintain a consistently green and healthy expanse of turf. One way to repair sections of the turf is to cut turf plugs from a growing location and move the turf plugs to another location to replace worn or browned patches of turf. Primarily greenskeepers of golf courses and professional gardeners desire to cut turf plugs, but anyone desirous of a beautiful landscape can cut turf plugs. Heretofore, turf plugging devices have been used which cut a round or octagonal plug, but no provision has been made to accommodate the need for straight edged square turf plugs having selectable depths.

Despite the need for a device adjustable to remove straight edged square turf plugs of differing depths, none was known. Thus, the need for an apparatus to facilitate the easy removal of varying depths of turf plugs with a square configuration was apparent.

Examples of the known art are shown in the following United States Patents : U.S. Pat. No. 630,483 to Brooks for a post hole digger; U.S. Pat. No. 1,783,026 to Ober for a transplanting device; U.S. Pat. No. 2,618,500 to Peach for a garden implement; and U.S. Pat. No. 3,273,930 to Gottfried for soil-extracting implements. The Brooks patent discloses a rectangular post hole digger with an ejector. The Peach patent shows a square garden implement. No depth adjustment is taught by either the Brooks or the Peach patents.

The Ober patent describes a transplanting device while the Gottfried patent shows soil-extracting implements. Both of these patents, although showing means for adjustment, are directed to soil removal, not turf removal. Further, square design adjustable depth soil removers for planting purposes are known. All of the above devices include ejector mechanisms to remove the plug of soil. These devices prevent stacking of soil plugs.

SUMMARY OF THE INVENTION.

It is an object of the invention to provide a square cut turf plugging device that is adjustable for depth of the turf plug, permits stacking of turf plugs within the device and permits easy extraction of turf plugs from the device.

It is also an object of the invention to provide a square cut turf plugging device for cutting selectable depth turf plugs that is easy and convenient to use while being highly efficient.

It is a further object of the invention to provide a convenient to use device for professional purposes as well as for amateur purposes, i.e., for use by seasonal workers and backyard gardeners. This is particularly desirable because the efficient cutting, storing and insertion of selectable depth turf plugs can speed a greenskeeper or gardener to other needed tasks. Thereby, the optimum appearance and health of the turf can be maintained in the least amount of time.

The invention comprises a device and method for cutting, removing and inserting adjustable depth plugs of square straight edged turf. A square straight edged turf plug is readily positionable and makes a clean patch where a straight edge must be maintained.

The device of the invention has a square frame with four sides with openings, a contiguous upper and lower end with an open top and bottom. The square frame forms an internal square cross section through the entire vertical height of the device. The square cut turf plugs are stacked and stored in the square interior storage space of the device. The square frame allows for the storage and easy transport of the cut turf plugs to the insertion location, while the open configuration of the frame allows access to the stored plugs. The plugs can be pushed out by hand or foot if necessary. Additionally, because the top as well as the bottom of the device is open, the turf plugs can be removed from both the top and the bottom of the device.

The number of plugs that can be contained in the open frame is dependent upon the depth that is selected for the turf plugs. Accordingly, a larger amount of turf plugs having a lesser depth, can be contained within the open frame, than can an amount of turf plugs having a greater depth.

A cutting edge is provided on the open bottom. The cutting edge is formed from the open bottom of the frame. The edge itself can be tapered and sharpened to act as the cutter Alternately, a separate cutting edge can be mounted to the open bottom.

Adjustable stops are positioned on the frame at the contiguous lower end, near the open bottom. The adjustable stops are pressure plates disposed on opposite sides of the frame, or on all the sides of the frame. The adjustable stops extend fully across the side of the frame to which the stop is attached. This extension of the stop across the lower side of the frame stabilizes the device, thus preventing rocking and the cutting of an inconsistent depth plug. This feature eases the operation of the device by the operator.

The adjustable stops are oriented in such a manner as to allow the user to step down and to thereby push the device into the turf to the selected depth. The adjustment of the stops allows the depth or thickness of the turf plug to be varied as needed. Consequently, the depth of the cut to be imparted to the plug can be varied as desired. The adjustable stops can be made from angle iron.

The adjustable stops are attached to the lower end of the frame by the placement of threaded bolts through elongated slots in the stops. The bolts are extended through apertures in the frame, and wing nuts are threaded onto the bolts to capture and hold the bolts in position Two bolts are deployed through apertures spaced apart for each stop. The stops are accordingly prevented from tipping across the side of the frame.

Handles are provided for positioning and moving the device. Cushioning material can be applied to the handles for the comfort of the operator while using the device. The handles are affixed to the frame by welding, threaded attachment or other known manners of attachment.

For a more complete understanding of the present invention, reference is made to the following detailed description when read in conjunction with the accompanying drawings wherein like reference characters refer to like elements throughout the several views, in which:

DESCRIPTION OF THE PREFERRED EMBODIMENT.

Figure 1:
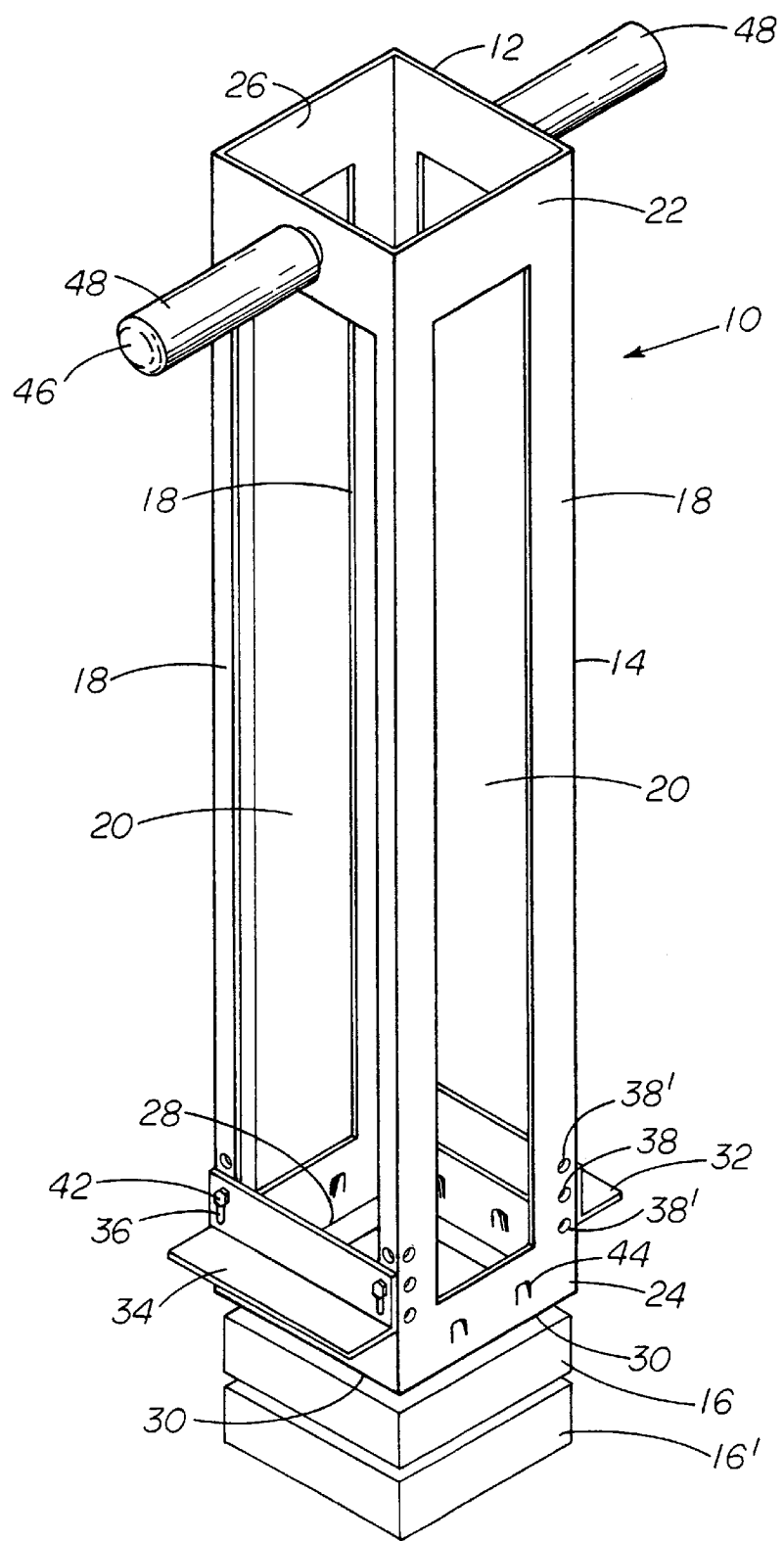
FIG. 1 illustrates a perspective view of the new turf cutting device.

In FIG. 1, the new turf cutting device or tool generally denoted as 10 is shown. The tool 10 is a turf cutting and removing device 12 having an upright frame 14 for containment of cut turf plugs 16, 16'. The upright frame 14 is comprised of four substantially identical sides 18 having openings 20 therethrough. A contiguous upper 22 and lower end 24 form the frame 14. The openings 20 in the four sides 18 allow for viewing the number of turf plugs 16, 16' stored in the device 12. Moreover, the openings 20 in the four sides 18 allow for an estimate of the number of turf plugs 16, 16' that can still be added to the device 12.

The top 26 is open as well as the bottom 28 of the device 12. Thus, by employing the above described open frame 14, hand or foot removal of any recalcitrant turf plugs 16, 16' that are caught in the device 12 is easy and quick in the field.

A cutting edge 30 is disposed along the open bottom 28 of the device 12. Ideally, the cutting edge 30 is formed from the open bottom 28 of the frame 14, however, some tapering to form a knife edge is preferable. Separate replaceable cutting edges (not shown) may be affixed to the open bottom 28 of the frame 14. Such replaceable cutting edges may be of advantage where the frame is made of a material that does not retain a good cutting edge in repeatedly cutting through turf.

Figure 2:
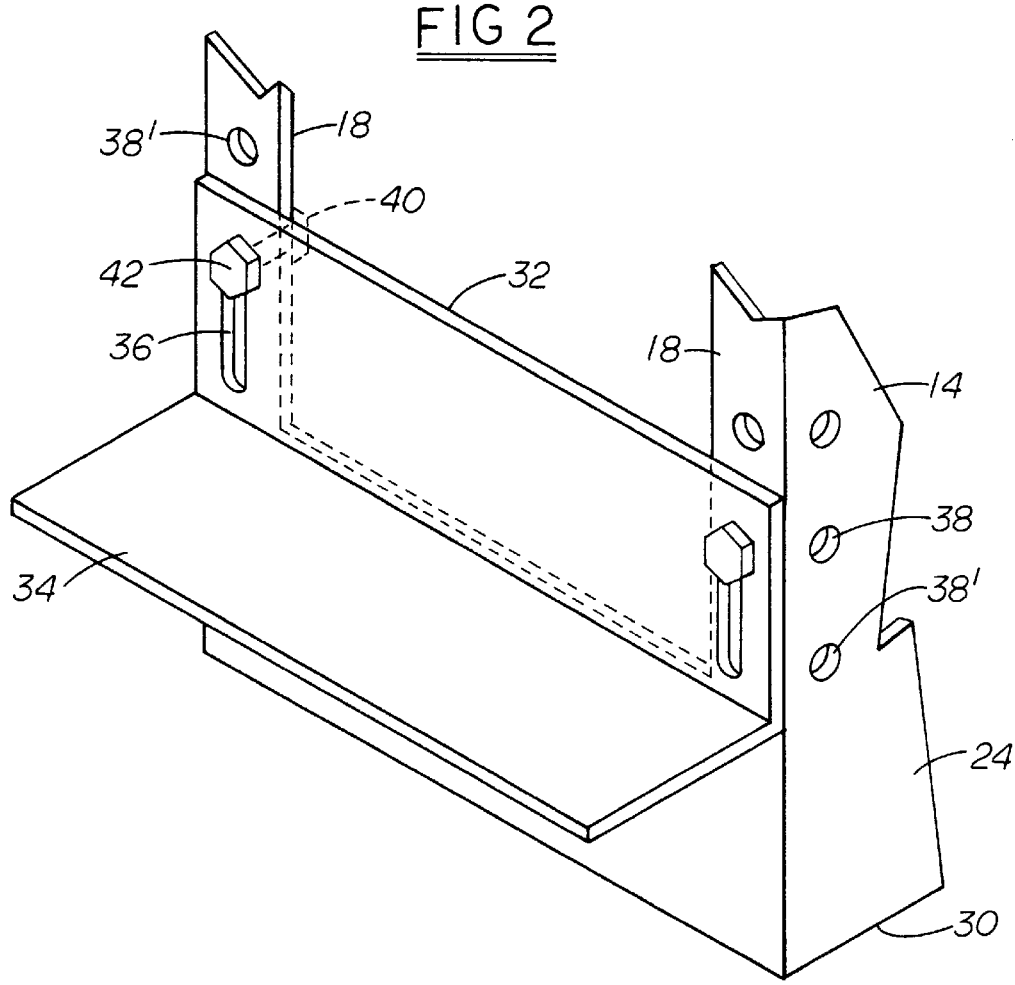
FIG. 2 illustrates a partial perspective view of the turf cutting device showing the adjustment in detail for setting the depth of the plug.

Referring now to FIG. 2, stop means for adjustment 32 of the depth of the turf plugs 16, 16' are shown near the open bottom 28 of the frame 14. The stop means for adjustment 32 of the depth comprise angled pieces 34 having elongated slots 36 disposed therein. The angled pieces 34 are shown located on opposite sides 18 of the frame 14. Apertures 38 are provided through the opposite sides 18 of the frame 14. Apertures 38 can be formed on all sides adjacent the contiguous lower end 24 to allow angled pieces 34 to be attached to any or all the sides if so desired. Additional apertures 38' may be provided above and below the apertures shown to extend the range of cutting depth beyond that of the elongated slots 36 without requiring larger angled pieces 34.

Attaching means 40 for adjustment means 32 may simply be bolts 42 with nuts therebehind. Threaded bolts 42 are placed through the elongated slots 36, continue through the apertures 38 in the frame 34 and are fastened by the nuts receiving and holding the threaded bolts 42.

Returning to FIG. 1 indentations or tabs 44 are formed in the lower end 24 to protrude inwardly a slight amount sufficient to provide positive grasp of the turf plug 16 and thereby forestall inadvertent release of the turf plug lowermost in the device 10.

Handles 46 extend normal to the upright open frame 14 from the contiguous upper end 22 near the open top 26 of the device 12. The handles 46 help the operator to maneuver the device 12 into position. Cushioning material 48 can be added to the handles 46 to make using the device 12 more comfortable.

The device can be manufactured from aluminum or plated steel and the frame welded together. Other materials such as plastic may be used if the materials have sufficient strength to withstand the pressure to be exerted on the lower end 24 by the stepping action to cut the turf plugs. With materials that are light and strong but do not retain a cutting edge at 30, the separate cutting edges described above may be preferred.

In use, the device 12 is first employed to remove worn or browned turf plugs in square configurations. Thereafter, the same device 12 is employed to cut healthy replacement turf into same size square plugs for insertion in substitution for the earlier removed turf.

Figure 3:
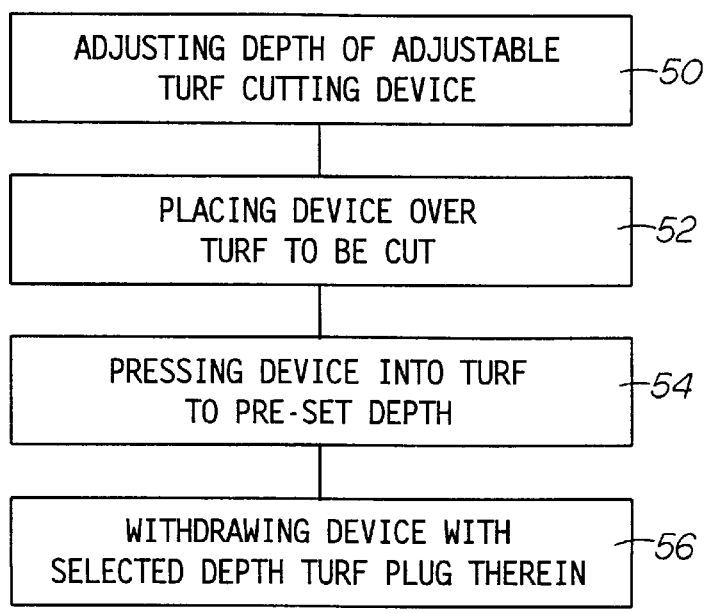
FIG. 3 illustrates the steps of the method for using the turf plugging device according to the invention.

Turning to FIG. 3, the steps of the method of use according to the invention are shown and described as follows:

The first step 50 is adjusting the depth of the adjustable turf cutting device for the depth of turf desired;

The second step 52 is placing the device over a section of turf to be cut;

The third step 54 is pressing the device into the turf to the pre-set depth; and The fourth step 56 is withdrawing the device with the selected depth of turf plug contained therein.

Further steps can comprise repeating the above steps until the device is fully loaded with turf plugs or until the desired number of turf plugs are loaded into the device. Thereafter, the device is positioned at the first location requiring the turf plugs and the turf plugs sequentially pushed out one by one at the first and sequential locations.

Having described my invention, many modifications thereto will become apparent to those skilled in the art to which it pertains without deviation from the spirit of the invention as defined in the appended claims.

I claim:

1. A portable turf cutting and removing device comprising a vertical frame square in plan view extending the entire height of the device, said vertical frame having a plurality of parallel vertical members forming sides, an upper end and a lower end each joining the parallel vertical members together to form a rectangular parallelepiped from the upper end to the lower end, the parallel vertical members providing a plurality of vertical openings therein, an open bottom, the open bottom and lower end forming cutting edges in a square configuration and adjustable stop means attacked to the vertical frame near at least one cutting edge of the lower end of the frame.

2. The portable turf cutting and removing device according to claim 1 wherein the adjustable stop means comprise at least two stops attachable to opposite side vertical members near the cutting edges.

3. The portable turf cutting and removing device according to claim 2 wherein the adjustable stop means further comprise elongated slots in the stops.

4. The portable turf cutting and removing device according to claim 3 further comprising means for attaching the stops.

5. The portable turf cutting and removing device according to claim 4 wherein the means for attaching the stops comprises bolts and nuts.

6. The portable turf cutting and removing device according to claim 1 including an open top and further comprising handle means affixed to the upper end adjacent to the open top.

7. The portable turf cutting and removing device according to claim 6 wherein the handle means comprises at least two handles disposed on opposite sides of the upper end.

8. The portable turf cutting and removing device according to claim 7 wherein the two handles extend parallel to at least one cutting edge of the device.

9. The portable turf cutting and removing device according to claim 7 wherein the handle means further comprises cushioning material.

10. The portable turf cutting and removing device according to claim 1 wherein the frame members form a vertical stacking storage area having a square cross section, the plurality of vertical openings providing access to plugs stored therein.

11. The portable turf cutting and removing device according to claim 1 including an open top, the open top providing access to plugs stored in the vertical frame.

* * * * *